June 15, 1937. W. C. LA BERGE 2,083,848
MEAT TENDERING DEVICE
Filed Nov. 7, 1935 3 Sheets-Sheet 1

Inventor
W. C. La Berge.
Hiram A. Sturges
Attorney

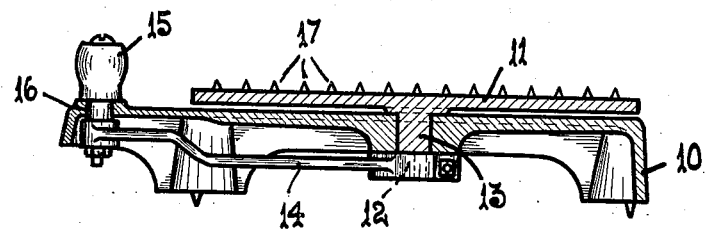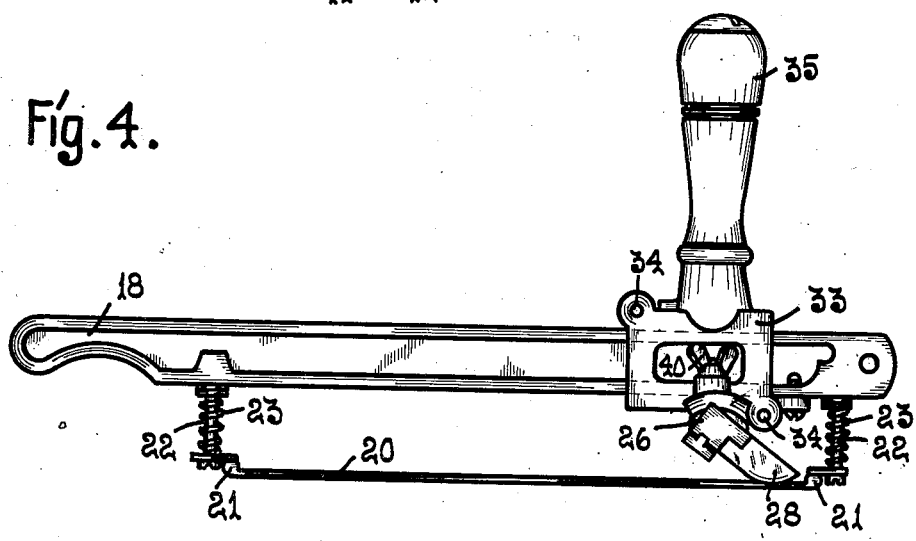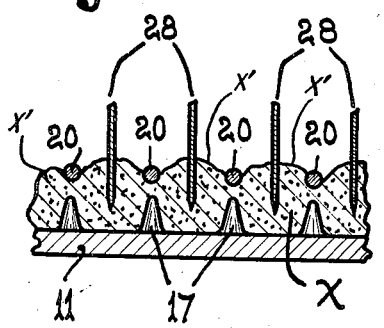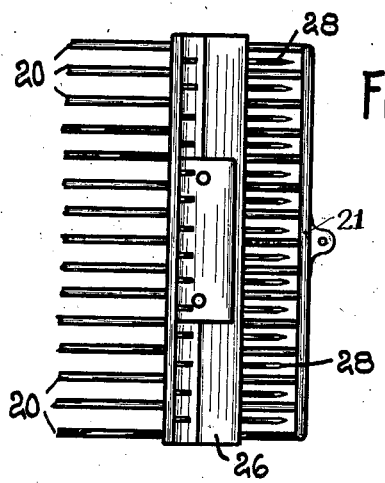

June 15, 1937.  W. C. LA BERGE  2,083,848
MEAT TENDERING DEVICE
Filed Nov. 7, 1935  3 Sheets-Sheet 3
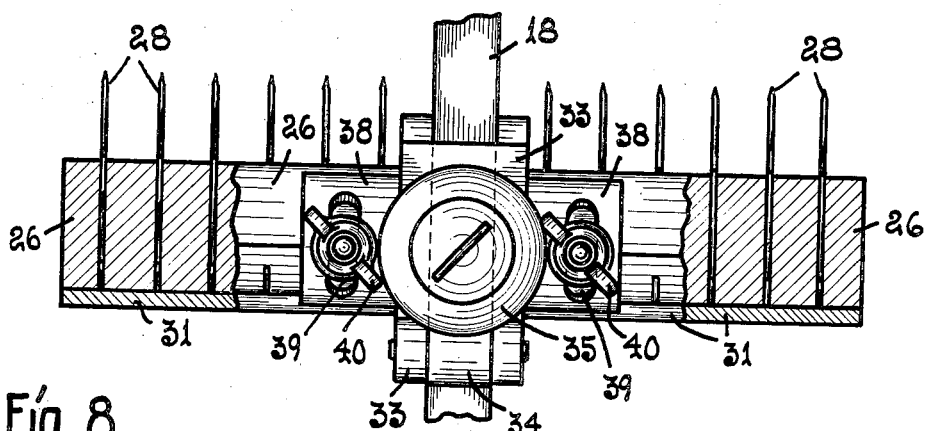
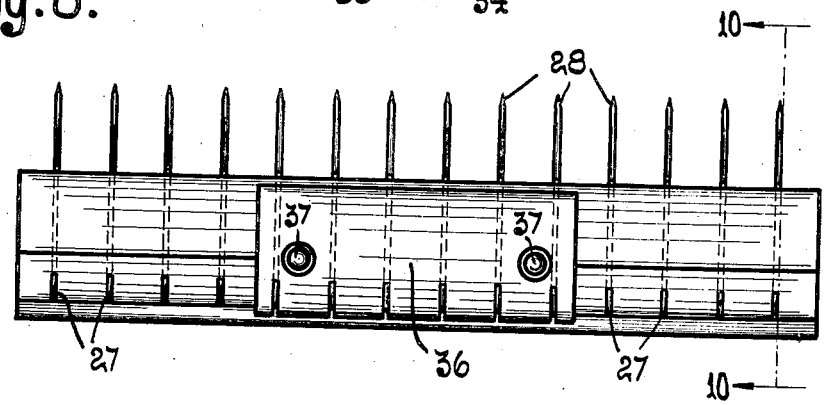
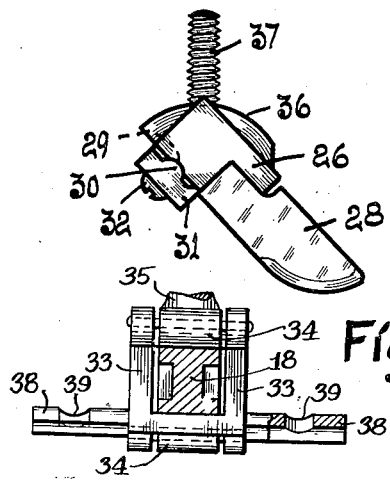
Inventor
W. C. La Berge.
Attorney Patented June 15, 1937

2,083,848

UNITED STATES PATENT OFFICE 2,083,848

MEAT TENDERING DEVICE

William C. La Berge, Omaha, Nebr.

Application November 7, 1935, Serial No. 48,703

5 Claims. (Cl. 17—25)

This invention relates to a meat tendering device, and has for its object, broadly, to provide a device of this class which will be more convenient in use than ordinary for scoring or tendering slices of meat, said device to consist of few and simple parts which may be practically and economically manufactured.

One of the specific objects is to provide operative parts which will prepare the meat in such a manner that parallel grooves or scorings will be formed therein, the parts between the grooves being pressed upwardly to form parallel ridges, these ridges being incised a part of their thickness so that the divided ridges or scorings thus formed will permit greater speed and uniformity than ordinary in cooking.

The invention includes a horizontal meat-supporting plate arranged to be swung in an arc of 90 degrees to permit rows of grooves to be formed at right-angles relative to each other, and includes means for adjusting the blades, so that grooves or furrows of varying depths may be cut, depending upon the thickness of the meat to be grooved or furrowed.

It is an object to provide means for the purpose mentioned which will not crush or flatten the meat but which, during operation, will hold the lower surface of a meat-slice firmly to prevent slipping, the upper surface to be incised, remaining loose along the ridges, this being important while tendering steaks of considerable thickness.

With the foregoing objects in view and others to be mentioned, the invention consists of the new and useful construction, combination and arrangement of parts as described herein and claimed, and as shown in the accompanying drawings, it being understood that changes may be made in form, size, proportions and minor details, said changes being within the scope of the invention as claimed.

In the drawings, Fig. 1 is a plan view of the meat tendering device, and Fig. 2 is a side view of the same.

Fig. 3 is a sectional view on line 3—3 of Fig. 1. Fig. 4 is a side of a movable handle-bar and parts carried thereby. Fig. 5 is a broken away plan view showing a cutter-bar and part of a pressure-frame. Fig. 6 is a view in transverse section showing part of a meat supporting-plate, contact-bars, and blades in position scoring a meat-portion, being an enlarged detail to illustrate operation, the section being on line 3—3 of Fig. 1.

Fig. 7 is a plan view, partly in section of the cutter-bar carried by a handle-bar and Fig. 8 is a plan view similar to the view shown in Fig. 7, the handle-bar and the coupling-member being removed. Fig. 9 is an end view of the cutter-bar and Fig. 10 is a section on line 10—10 of Fig. 8.

Fig. 11 is a detail relating to Fig. 7, showing a front view of a coupling-member for the handle-bar, one of the slotted wings of the coupling member being partly in section.

Figure 1:
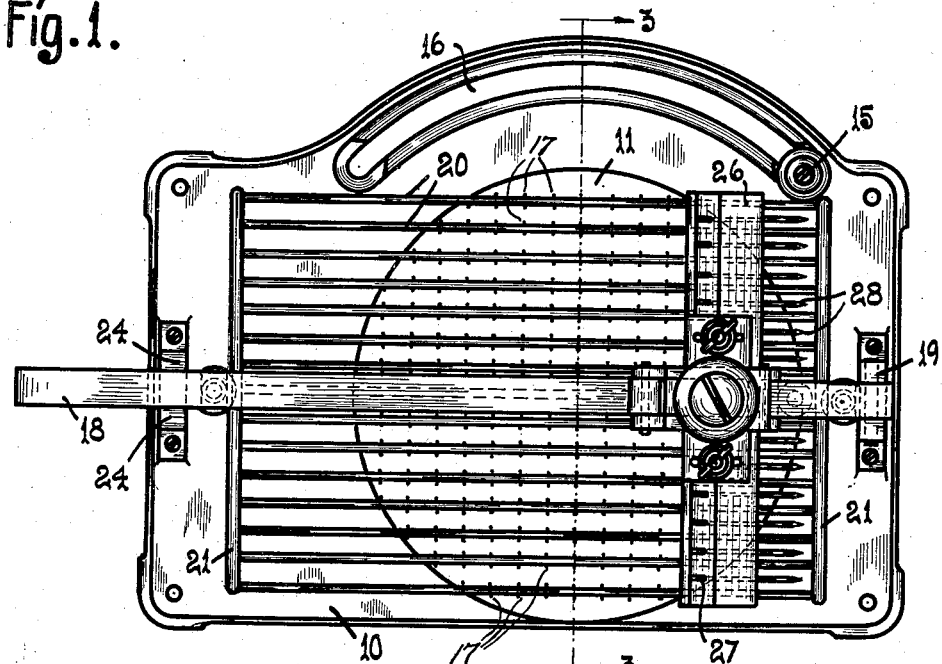
Figure 2:
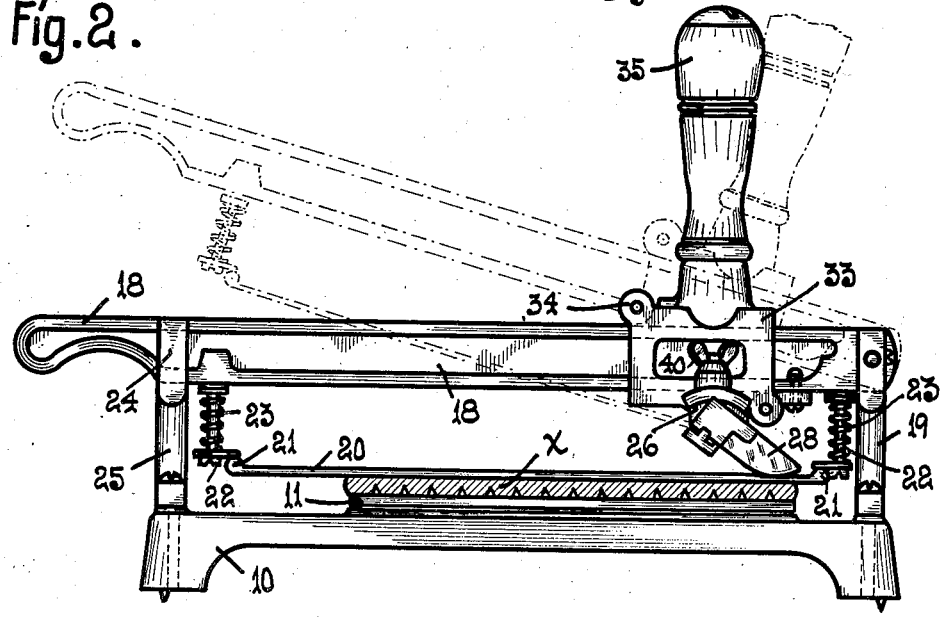

Referring now to the drawings for a more particular description, the device consists in part, of a stationary base 10 upon which is disposed a horizontal meat-supporting plate 11, said plate, upon its lower side and centrally thereof, being provided with a pivot-pin 13 adapted to fit into and to be secured to a coupling-head 12, and by use of a link 14 it will be understood that the plate 11 may have a rotary movement of 90 degrees in either direction, said link being provided with a handle 15 engaging in a segmental slot 16 for this purpose.

The meat-supporting plate 11 is provided with upwardly projecting teeth 17 which prevent sliding movements of the meat $x$ thereon, said teeth being disposed in uniformly spaced, parallel rows, and since the teeth of each row are disposed at uniform distances from each other, cross-rows will be formed, that is to say, rows will appear on said plate at right-angles to each other, this being important since, as will be explained, by operation of the movable cutter-bar, rows of furrows or grooves will be formed at right-angles to each other in the upper surface of the meat, the plate 11 being swung, during operation, in an arc of 90 degrees as mentioned.

Numeral 18 indicates a handle-bar adapted to be swung upwardly and downwardly above the plate 11, one of its ends being pivotally maintained on a post 19.

In order that the meat-slice $x$ may be pressed downwardly upon the plate 11 and its teeth 17, a pressure frame is provided consisting of a plurality of contact-bars 20 secured at their ends to head-strips 21.

The handle-bar 18 is provided with a pair of downwardly projecting arms 22 which extend through the strips 21, and therefore vertical slidable movements are permitted of the pressure-frame on said arms 22, subject to the control of springs 23 carried by said arms.

As thus described the pressure-frame moves with the handle-bar, and a downward swinging movement of the handle-bar will cause the teeth 17 to enter the lower side of the meat, each pressure-bar, midway between two adjacent rows of teeth operating to press the meat downwardly between the rows of teeth, and therefore parallel meat-ridges x' will be formed, each meat-ridge x' being disposed midway between two adjacent contact-bars.

It will be noted that the rows of teeth 17 and contact-bars 20 are disposed parallel with the handle-bar 18. Also the contact-bars are disposed at uniform distances from each other, this distance being the same as the distance between the rows of teeth 17. Also it will be noted that when the handle-bar has been swung downwardly each contact-bar 20 will be disposed in the vertical plane of a row of teeth 17.

By use of the parts mentioned slices of meat or steaks of any desired thickness may be held in stationary position ready to be scored, the front end of the handle-bar 18, when swung downwardly, entering between the upright prongs 24 of a supporting-post 25.

It will be seen that the parts thus far described are arranged for convenient operation. The handle-bar 18 together with the pressure-frame may be swung upwardly from the post 19 so that the meat-supporting plate 11 will be accessible for placing meat thereon or for its removal, or for removing the plate 11 from the base frame 10 whenever said plate requires cleaning, and when the handle is swung downwardly it may move into the recess between the prongs 24 of the post 25 a suitable distance for engagement of the contact-bars with the meat.

Numeral 26 indicates a cutter-bar provided transversely with slots 27 for receiving blades 28, said bar 26 being disposed below the handle-bar, at right angles thereto and above the contact-bars 20.

The slots 27 are disposed parallel and uniformly spaced relative to each other, and the distance between adjacently disposed blades is equal to the distance between adjacently disposed contact-bars, and each blade is disposed in a plane midway between two contact-bars 20 of the pressure-frame 21.

Each blade, preferably, is provided with a notch 29 opening on its lower edge for receiving a ridge 30 of a binding-strip 31 which is secured by keepers 32 to the cutter-bar, and on account of this arrangement of parts the blades will be securely held in the slots, and may be removed from the cutter-bar if desired, upon removal of the binding strip from said cutter bar.

Numeral 33 indicates a coupling-member slidingly mounted on the handle-bar 18, said bar operating as a track. The coupling-member preferably is provided with rollers 34 which bear on the track or bar 18 to prevent any rocking movements and to avoid undue friction of said coupler during its sliding movements, said coupling-member being provided with a removable handle 35 of non-metallic material.

The cutter-bar 26 is provided midway between its ends with a convex bearing surface 36, and a pair of threaded arms 37 project upwardly therefrom.

The coupling-member 33 is provided with a pair of concavo-convex wings 38 which project horizontally from its sides, each wing being provided with a slot 39 extending parallel with the handle-bar 18, said slots receiving the threaded arms 37, and by use of a pair of wing-nuts 40 rotatable on the arms 37 the cutter-bar may be secured to the coupling-member, and on account of this arrangement of parts adjustments may be made for maintaining the blades at predetermined distances from the heat-supporting plate 11.

If it is desired that the blades may cut deeper into the meat-ridges x' the cutter-bar may have a slight rotatable movement in one direction after the wing-nuts have become loosened from their engagement with the wings 38, and after a suitable adjustment has been made the wing-nuts may be rotated in a direction reverse to their former rotation for securing the cutter-bar rigidly to said coupling-member.

The pressure-frame, by a downward movement of the handle-bar will cause the contact-bars 20 to sink deeply into the meat ridges x', and since the rows of teeth of plate 11 are disposed in vertical planes of said contact-bars the fibrous meat between the bars 20 and perforations caused by the teeth will be rendered tender.

It will be appreciated that thin slices of meat may be tenderized as well as slices of greater thickness.

I claim as my invention:—

1. In a meat tendering device, a base, a meat-supporting plate on the base and provided with upwardly projecting teeth disposed in parallel rows, a pivotally mounted handle-bar above said plate, a pressure-frame carried by and having contact-bars disposed parallel with the handle-bar, a cutter-bar having a pair of upwardly projecting arms and provided with blades disposed in planes parallel with the plane of the handle-bar, a coupling-member on the handle-bar having a pair of slotted wings receiving the arms of the cutter-bar, and wing-nuts threaded on said arms for engaging the slotted wings, said coupling-member being movable on the handle-bar, and each blade moving longitudinally of and midway between two adjacently disposed contact-bars of said pressure-frame.

2. In a meat tendering device, a base, a meat-supporting plate on the base provided with upwardly projecting teeth disposed in rows, a handle-bar, a pressure-frame carried by the handle-bar and including a series of contact-bars each disposed in a plane parallel with the handle-bar and a row of teeth of the meat-supporting plate, a cutter-bar provided with a series of parallel blades and a pair of upwardly projecting arms, a coupling-member mounted on the handle-bar and having a pair of slotted wings receiving the arms of the cutter-bar, and wing-nuts threaded on the arms of said cutter-bar for securing the latter to said coupling-member said handle-bar being mounted to permit a swinging movement thereof for causing a pressure of meat between the contact-bars of the pressure-frame and teeth of said meat-supporting plate and for causing ridges to be formed between said contact-bars, and said coupling-member being adapted to have a sliding movement on the handle-bar to cause the blades to move along said ridges for scoring the meat.

3. In a meat tendering device, a base, a meat-supporting plate on the base, a handle-bar above the meat-supporting plate, a pressure-frame disposed below and movable with the handle-bar and provided with a series of contact-bars each disposed parallel with said handle-bar, a coupling-member on the handle-bar and provided with a pair of slotted wings of concavo-convex form, a cutter-bar provided with a series of blades disposed in planes parallel with the plane of the handle-bar and having a pair of upwardly projecting arms adapted to engage in selected parts of the slots of said wings for adjusting said cutter-bar and said blades to a selected inclination relative to said pressure-frame, and wing-nuts threaded on said arms for engaging the cutter-bar, said handle-bar being mounted to permit a downward swinging movement, and said coupling-member being movable on the handle-bar for causing a movement of the blades longitudinally of the pressure-frame midway between the contact-bars thereof.

4. In a tenderizing device, a base-plate provided with a curved slot, a meat-supporting plate of disc-form having upwardly projecting teeth arranged in right-angled rows, and having a central, downwardly projecting pivot-pin journalled in the base-plate, a handle-bar, a pressure-frame including parallel contact-bars carried by the handle-bar, said handle-bar being mounted to permit a downward swinging movement to cause the meat on said supporting-plate to be depressed in parallel lines between the teeth of said rows and bars of the pressure-frame and for causing formation of parallel upset ridges of meat between said rows of teeth, a link below the base-plate having a coupling-head secured to the pivot-pin of the supporting-plate and having a handle movable in said slot concentric with the pivot-pin for moving the supporting-plate, and a plurality of blades arranged to be moved parallel with and between the bars of the pressure-frame for incising the meat along said ridges.

5. In a meat tendering device, a base-plate, a meat-supporting plate on the base plate, a swingably mounted handle-bar above the meat-supporting plate, a pressure-frame carried by and having contact-bars disposed parallel with the handle-bar, a cutter-bar having a convex surface with a pair of arms projecting upwardly therefrom and provided with blades disposed in planes parallel with the plane of said handle-bar, a coupling-member slidably mounted on the handle-bar, and having wings with concave parts slidably mounted on the convex surface of the cutter-bar and provided with slots receiving the arms of said cutter-bar, and movable wing-nuts threaded on said arms for securing the wings to said cutter-bar.

WILLIAM C. LA BERGE.